(12) United States Patent
Fan et al.

(10) Patent No.: US 7,151,894 B2
(45) Date of Patent: Dec. 19, 2006

(54) BIT ERROR RATE BASED SYSTEM AND METHOD FOR OPTIMIZING COMMUNICATION SYSTEM PERFORMANCE

(75) Inventors: Nong Fan, Irvine, CA (US); Tuan Hoang, Westminster, CA (US); Hongtao Jiang, Anaheim, CA (US); Keh-Chee Jen, Las Flores, CA (US)

(73) Assignee: Broadcom Corporation, Irvine, CA (US)

( * ) Notice: Subject to any disclaimer, the term of this patent is extended or adjusted under 35 U.S.C. 154(b) by 627 days.

(21) Appl. No.: 10/409,293

(22) Filed: Apr. 8, 2003

(65) Prior Publication Data

US 2004/0028404 A1 Feb. 12, 2004

Related U.S. Application Data

(60) Provisional application No. 60/402,121, filed on Aug. 7, 2002.

(51) Int. Cl.
*H04B 10/08* (2006.01)
*H04B 17/00* (2006.01)
*H04B 10/00* (2006.01)

(52) U.S. Cl. .................... 398/22; 398/25; 398/27; 398/33; 398/136

(58) Field of Classification Search .................. 398/27, 398/25, 28, 33, 22, 135, 136, 137, 138, 139
See application file for complete search history.

(56) References Cited

U.S. PATENT DOCUMENTS 5,455,536 A 10/1995 Kono et al.
5,623,355 A * 4/1997 Olsen .................... 398/162
5,721,756 A 2/1998 Liebetreu et al.
2002/0072340 A1* 6/2002 Hutchison et al. .......... 455/127
2003/0046708 A1* 3/2003 Jutzi .................... 725/120

FOREIGN PATENT DOCUMENTS

JP 61012138 1/1986

OTHER PUBLICATIONS

IEEE Draft P802.3ae/D5.0, *Media Access Control (MAC) Parameters, Physical Layer, and Management Parameters for 10 Gb/s Operation*, pp. i-536.

* cited by examiner

Primary Examiner—M. R. Sedighian
(74) Attorney, Agent, or Firm—McAndrews, Held & Malloy, Ltd.

(57) ABSTRACT

A system (50) includes a communication path (170) and transmits data on a network (103, 106). A transmitter (101) transmits data on the network and a receiver (112) receives data from the network. A component (102, 114) in the communication path has a transfer characteristic (C1, C2, C3) adjusted in response to errors in data transmitted over and received from the network in order to reduce the error rate.

20 Claims, 4 Drawing Sheets

BIT ERROR RATE BASED SYSTEM AND METHOD FOR OPTIMIZING COMMUNICATION SYSTEM PERFORMANCE

CROSS-REFERENCE TO RELATED APPLICATIONS/INCORPORATION BY REFERENCE

U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13MM CMOS" filed on Jun. 21, 2002, and U.S. application Serial No. 60/402,097 entitled "SYSTEM AND METHOD FOR IMPLEMENTING A SINGLE CHIP HAVING A MULTIPLE SUB-LAYER PHY" filed on Aug. 7, 2002, are each incorporated herein by reference in their entirety. The applicants claim the benefit of provisional application No. 60/402,121, filed Aug. 7, 2002.

Federally Sponsored Research or Development

[Not Applicable]

SEQUENCE LISTING

[Not Applicable]

MICROFICHE/COPYRIGHT REFERENCE

[Not Applicable]

BACKGROUND OF THE INVENTION

Embodiments of the present invention relate generally to adaptive techniques for improving the accuracy of network transmission and relate more particularly to such techniques for reducing the error rate of network transmission.

High-speed digital communication networks over copper and optical fiber are used in many network communication and digital storage applications. Ethernet and Fiber Channel are two widely used communication protocols used today and continue to evolve to respond to the increasing need for higher bandwidth in digital communication systems.

The Open Systems Interconnection (OSI) model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it.

Layers 1 to 4 handle network control and data transmission and reception. Layers 5 to 7 handle application issues. Specific functions of each layer may vary to a certain extent, depending on the exact requirements of a given protocol to be implemented for the layer. For example, the Ethernet protocol provides collision detection and carrier sensing in the data link layer.

The physical layer, Layer 1, is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement this layer.

As data rate and bandwidth requirements increase, 10 Gigabit data transmission rates are being developed and implemented in high-speed networks. Pressure exists to develop a 10 Gigabit physical layer for high speed serial applications. Transceivers for 10 G applications are needed for the 10 G physical layer. The specification IEEE P802.3ae draft 5 describes the physical layer requirements for 10 Gigabit applications and is incorporated herein by reference in its entirety.

An optical-based transceiver, for example, includes various functional components such as clock data recovery, clock multiplication, serialization/de-serialization, encoding/decoding, electrical/optical conversion, descrambling, media access control, controlling, and data storage. Many of the functional components are often implemented each in a separate IC chip.

Transceiver modules in the past have allowed bit error rates to be checked to determine the quality of data transmission. However, such modules have not permitted adaptive alteration of module components to reduce the bit error rate. This invention addresses the problem and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful in a system including a communication path for transmitting data on a network and receiving data from the network. In such an environment, the system can be adaptively adjusted to reduce data transmission errors by an apparatus comprising a transmitter arranged to convert the data to a form transmittable on the network, and a receiver arranged to convert the data received from the network to converted data having a form suitable for analysis. At least a first component is arranged in the communication path. The component has a transfer characteristic adjustable by at least a first control signal. A module is arranged to analyze the converted data to generate one or more error signals responsive to errors in the converted data. A controller responsive to the one or more error signals is arranged to generate at least the first control signal to adjust the transfer characteristic of the first component.

One method embodiment of the invention is useful in a system including a communication path defining at least a first transfer characteristic for transmitting data on a network and receiving data from the network. In such an environment, the system can be adaptively adjusted to reduce data transmission errors by a method comprising converting the data in the communication path to a form transmittable on the network and converting the data in the communication path received from the network to converted data having a form suitable for analysis. The converted data is analyzed to generate one or more error signals responsive to errors in the converted data. At least a first control signal is generated in response to the one or more error signals, and at least the first transfer characteristic of the communication path is adjusted in response to the first control signal.

By using the foregoing techniques, data errors may be reduced with a degree of speed and accuracy previously unavailable.

These and other advantages, aspects and novel features of the present invention, as well as details of an illustrated embodiment thereof, will be more fully understood from the following description and drawings.

DETAILED DESCRIPTION OF THE INVENTION

Figure 1:
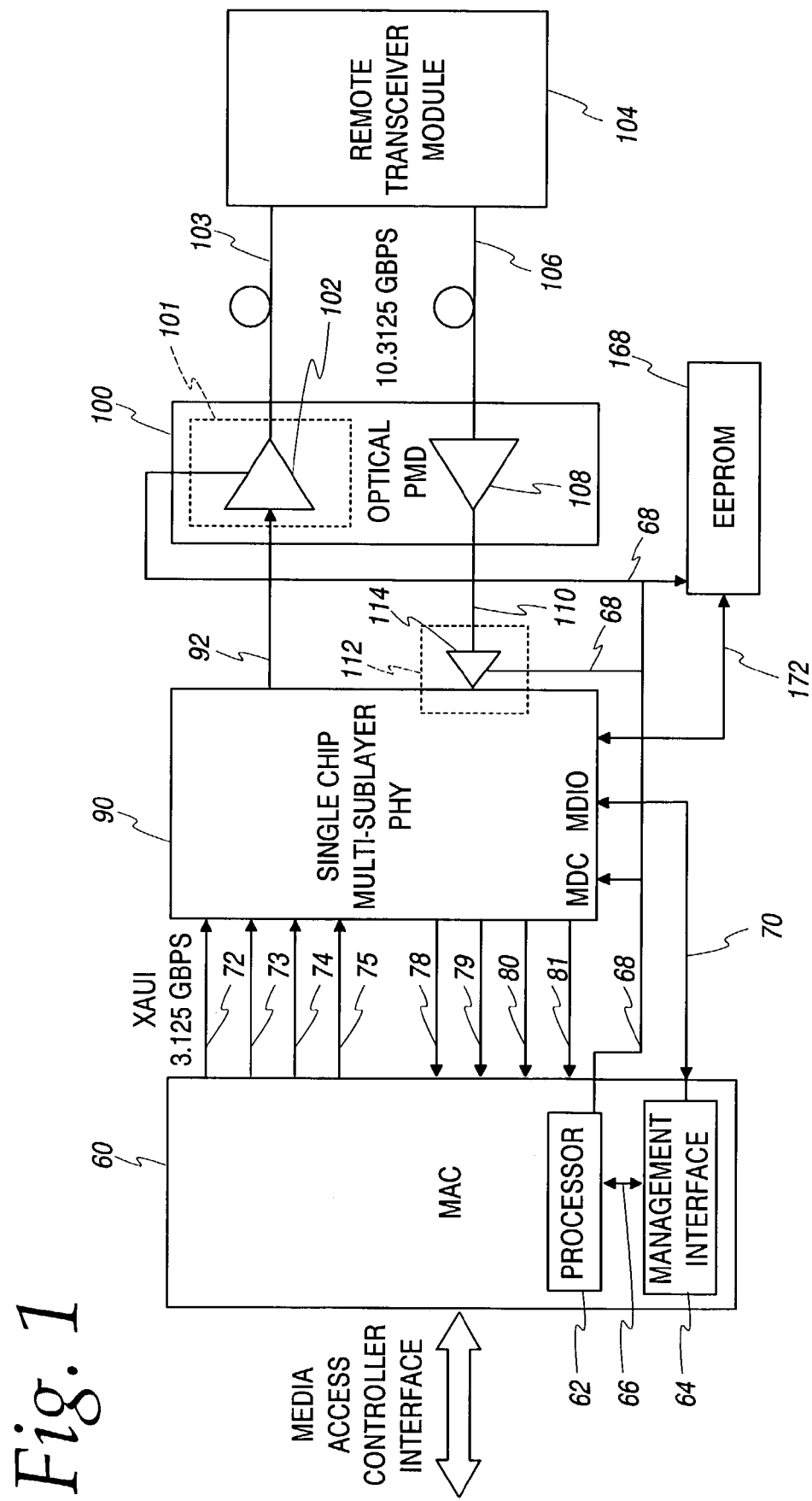
FIG. 1 is a schematic block diagram of a system for transmitting data on and receiving data from a network in accordance with one embodiment of the present invention.

Referring to FIG. 1, a system 50 for transmitting data on a network and receiving data from the network made in accordance with one embodiment of the invention includes a media access controller (MAC) 60, which includes a processor or controller 62. The processor 62 communicates with a management interface 64 over a bus 66 and communicates with a control bus 68 that transmits control signals generated by processor 62. The control signals are generated according to an error correction algorithm in response to error signals received by interface 64 over an input/output bus 70. Module 60 transmits data at about 3.125 Giga bits per second (Gbps) on each of paths 72–75, and module 60 receives data at about 3.125 Gbps on each of paths 78–81.

A single chip multi-sublayer PHY 90 includes modules for converting the 3.125 input parallel data on paths 72–75 to serial 10.3125 Gbps electrical output data on a path 92. The output data is converted to optical data by a conversion module 100, which includes a transmitter 101 comprising a laser diode 102. The laser diode converts the electrical input data to optical output data according to a transfer characteristic in response to a bias current.

Figure 3:
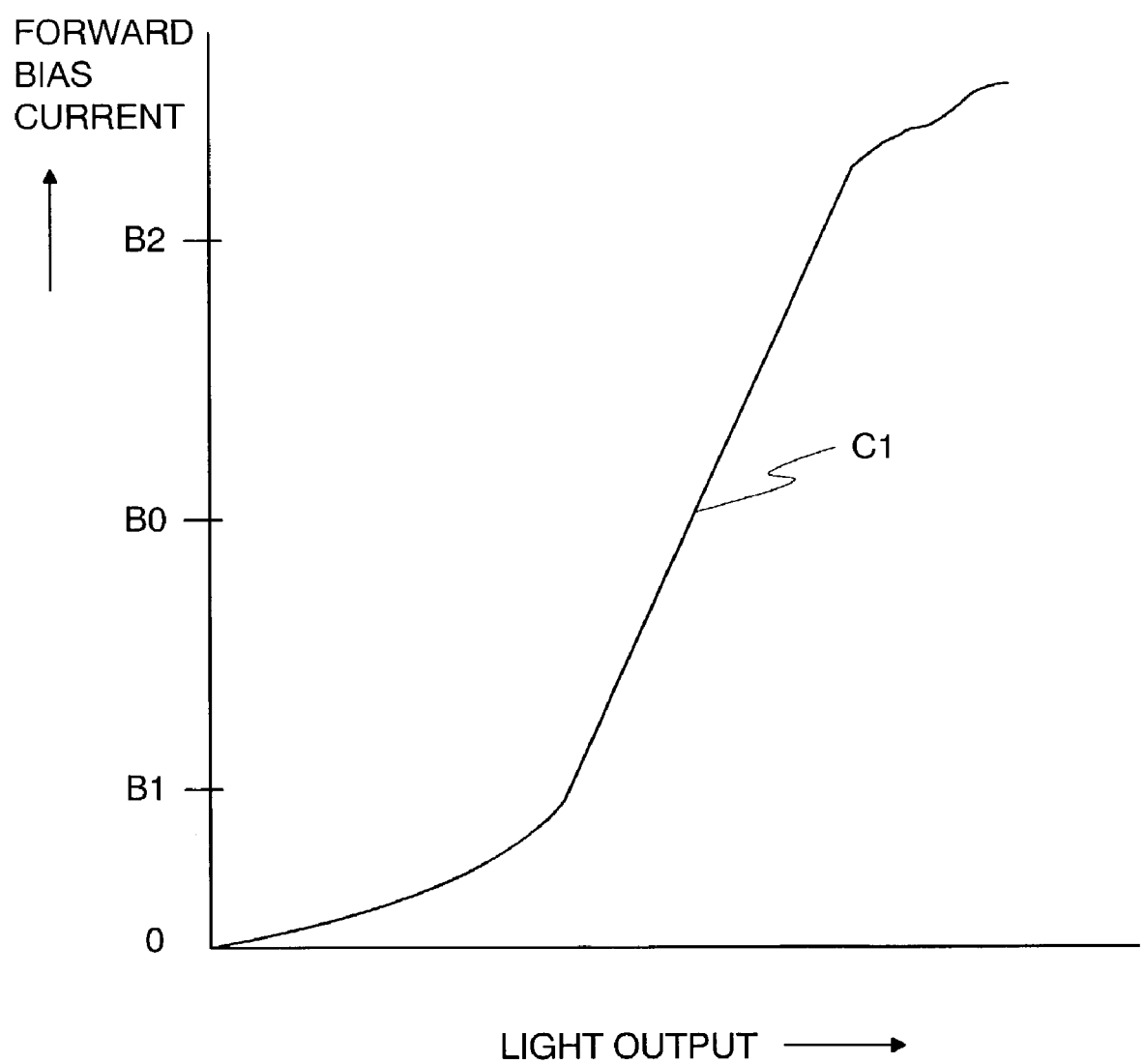
FIG. 3 is a graph illustrating an exemplary transfer characteristic of the laser shown in FIG. 1.

One exemplary transfer characteristic for diode 102 is illustrated in FIG. 3. The transfer characteristic takes the form of a characteristic curve C1. The curve is essentially linear between bias current values B1 and B2. As a result, it is advantageous to locate the operating point of the laser at about bias current value B0 to avoid clipping of input data signals. If the bias current falls substantially below current value B1, distortion of the light signals results, thereby degrading the accuracy of the data due to the introduction of data errors. Likewise, if the bias current rises substantially above value B2, data errors also are created. Thus, by controlling the bias current, data errors can be reduced. The transfer characteristic of diode 102 changes from time to time as a result of aging and temperature variation, among other parameters. Therefore, data errors can be reduced if the bias current is adaptively controlled.

The light output data is transmitted serially by transmitter 101 over an optical fiber network 103 to a remote transceiver module 104 at about 10.3125 Gbps. Data is transmitted serially at about 10.3125 Gbps from transceiver module 104 over an optical fiber network 106 to a converter 108 in module 100 that converts the light data into corresponding electrical signals at about 10.3125 Gbps.

Figure 4:
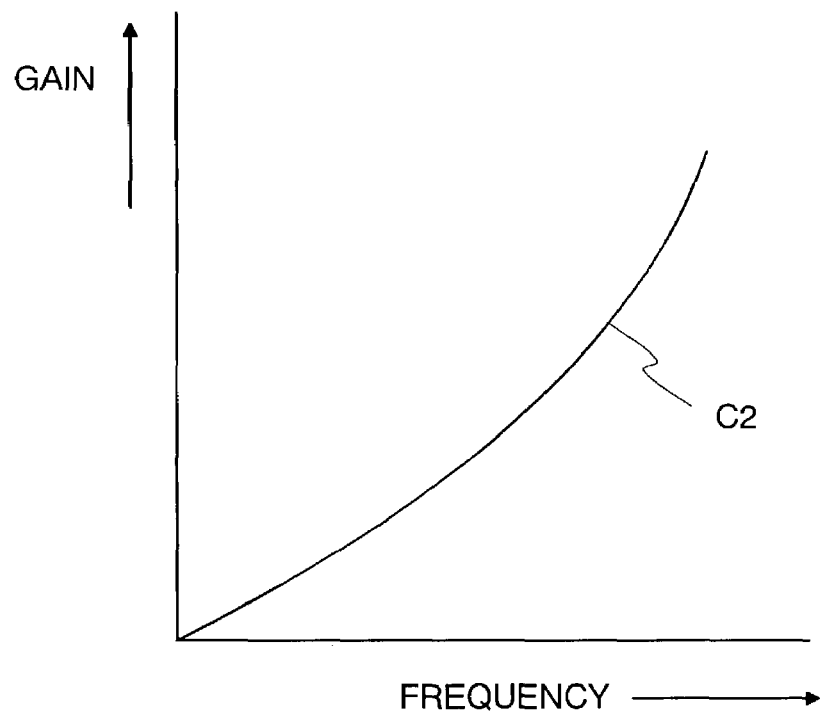
FIG. 4 is a graph illustrating an exemplary first transfer characteristic of the amplifier shown in FIG. 1.
Figure 5:
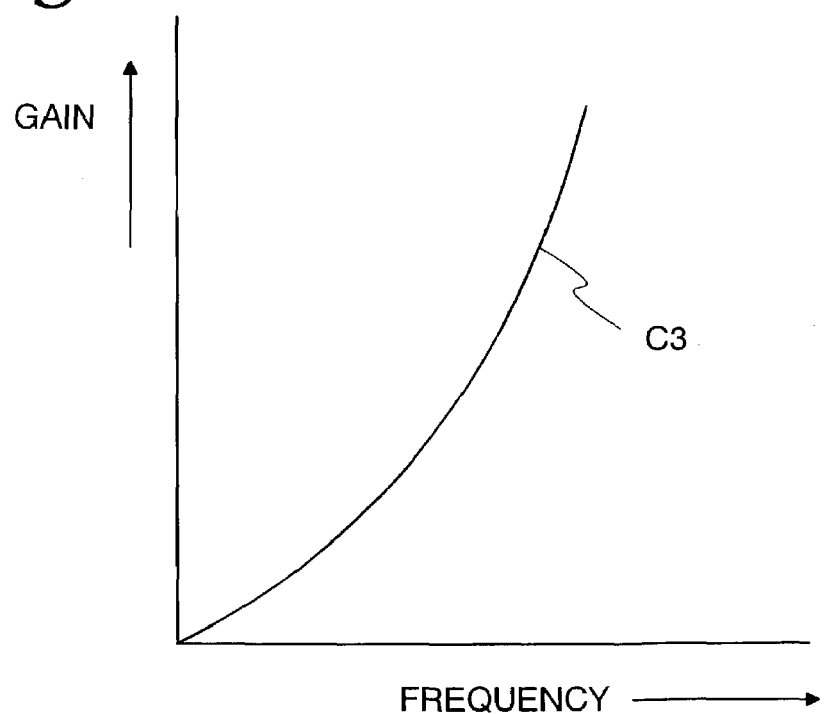
FIG. 5 is a graph illustrating an exemplary second transfer characteristic of the amplifier shown in FIG. 1.

The electrical signals are transmitted serially over a path 110 at about 10.3125 Gbps to a receiver 112 integrally formed with chip 90. The receiver includes an amplifier 114, which has a plurality of transfer characteristics that can be selected by the state of a signal on bus 68. One exemplary transfer characteristic for amplifier 114 is shown in FIG. 4 by nonlinear characteristic curve C2. Curve C2 increases the gain of amplifier 114 nonlinearly with increasing frequency in order to overcome the attenuation of high frequencies by networks 103 and 106. Another exemplary transfer characteristic for amplifier 114 is shown in FIG. 5 by nonlinear characteristic curve C3. Curve C3 increases the gain of amplifier 114 nonlinearly with increasing frequency at a higher rate than curve C2 in order to overcome the attenuation of high frequencies by networks 103 and 106. Curve C3 is used if the attenuation of high frequencies increases compared to the attenuation experienced while using curve C2.

Figure 2:
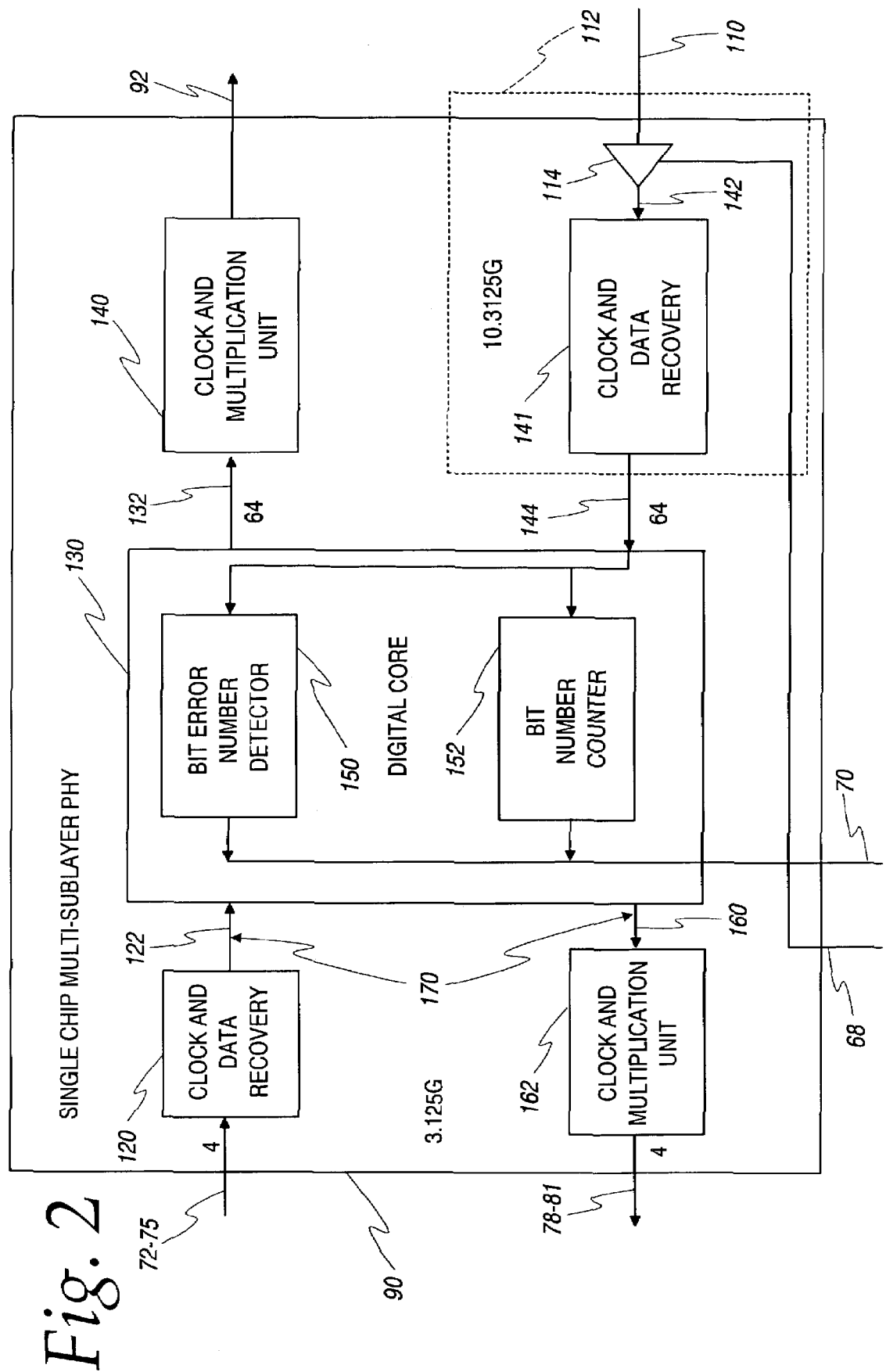
FIG. 2 is a schematic block diagram of the single chip multi-sublayer PHY shown in FIG. 1.

FIG. 2 shows additional details of chip 90. A clock and data recovery module 120 clocks data received at a 3 Gigabit data rate over paths 72–75 and passes the data over a path 122 to a digital core unit 130, which performs the functions including data lane synchronization, data decoding, data lane alignment, and data encoding.

Data from unit 130 is transmitted over a 64 bit wide path 132 to a clock and multiplication unit 140 that clocks data at a 10 Gigabit output data rate.

Amplifier 114 transmits data to a clock and data recovery module 141 over a path 142, and module 141 transmits data over a 64 bit wide path 144 to digital core unit 130. Module 141 is similar to module 120. Amplifier 114 and module 141 together form the receiver 112 that converts the data received from network 106 to converted data having a form suitable for analysis by unit 130.

A portion of the data generated by the digital core 130 for transmission on network 103 includes error-checking data with known values. The same error-checking data also is received from network 106. Unit 130 includes a bit error number detector 150 that determines the number of errors in the error checking data transmitted by receiver 112 and generates a corresponding error signal. A bit number counter 152 counts the number of bits of the error-checking data and generates a corresponding error signal. The error signals generated by detector 150 and counter 152 are transmitted over bus 70 to processor 62 in time division multiplex fashion. Processor 62 divides the number of errors by the number of bits in the error-checking data to determine the data error rate of the communication system.

Data from the digital core 130 is transmitted over a path 160 to a clock and multiplication unit 162 that is similar to unit 140. Data is transmitted from module 162 at a 3 Gigabit data rate to paths 78–81.

Referring to FIGS. 1 and 2, various components form a communication path 170 for system 50. The transmit portion of the communication path begins on paths 72–75 and extends through module 120, path 122, digital core 130, path 132 unit 140, path 92, and conversion module 100. The receive portion of the communication path begins with conversion module 100 and extends through path 110, receiver 112, path 144, core 130, path 160 and unit 162.

Processor 62 uses the data error rate of the communication system to generate control signals on bus 68. For example, if the error rate indicates that a change in the operating point bias of laser 102 might improve the error rate, a control signal is generated on bus 68 by processor 62 that changes the bias current of laser 102. If the error rate indicates that a change in the transfer characteristic of amplifier 114 may improve the error rate, then another control signal is generated that replaces the current transfer characteristic of amplifier with another transfer characteristic. For example, the characteristic shown in FIG. 5 may be substituted for the characteristic shown in FIG. 4. Data for the various transfer characteristics of amplifier 114 may be stored in EEPROM 168 (FIG. 1) and the data may be transmitted to amplifier 114 on bus 172 that is controlled by processor 62. The control signal on bus 68 determines which data is read from EEPROM 168 and transmitted to amplifier 114. Of course, the transfer characteristics of both laser 102 and amplifier 114 may be changed during the same time period by proper control signals from processor 62.

The operation of the system may be summarized as follows:

Chip 90 and conversion module 100 convert data in the transmit portion of communication path 170 to a form transmittable on network 103. The data is sent to remote transceiver module 104 and is retransmitted over network 106 to conversion module 100. Module 100 and receiver 112 convert the data in the receiver portion of communication path 170 to converted data having a form suitable for analysis by detector 150 and counter 152. The converted data is analyzed by detector 150 and counter 152 to generate the previously-described error signals. One or more control signals are generated by processor 62 in response to the error signals in the manner previously described. In response to the control signals, the transfer characteristic of laser 102 or amplifier 114, or both, can be adjusted to decrease the data error rate.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. In a system including a communication path for transmitting data on an optical fiber network and receiving data from the network, apparatus for adaptively adjusting the system to reduce data transmission errors comprising:
   a transmitter arranged to convert the data to a form transmittable on the network;
   a receiver arranged to convert the data received from the network to converted data having a form suitable for analysis;
   at least a first component in the communication path having a transfer characteristic adjustable by at least a first control signal;
   a module arranged to analyze the converted data to generate one or more error signals responsive to errors in the converted data, the module being configured to receive the data on parallel data lines at a first data rate and to send the data to the transmitter on a single serial line at a second data rate that is greater than the first data rate; and
   a media access controller responsive to the one or more error signals arranged to generate at least the first control signal to adjust the transfer characteristic of the first component,
   wherein the transmitter, the receiver, the first component, the module and the controller are part of a transceiver device, and
   wherein the data flows from media access controller to the module to the transmitter before being transmitted on the network.

2. The apparatus of claim 1 wherein the component comprises a laser operated with a bias current and wherein the first control signal adjusts the bias current in order to adjust the transfer characteristic.

3. The apparatus of claim 2 wherein the laser is included in the transmitter.

4. The apparatus of claim 1 wherein component comprises an amplifier, wherein the transfer characteristic comprises an adjustable nonlinear transfer characteristic and wherein the first control signal adjusts the nonlinear transfer characteristic.

5. The apparatus of claim 4 wherein the amplifier is included in the receiver.

6. The apparatus of claim 5 wherein the controller generates a second control signal and further comprising a second component comprising a laser included in the transmitter, said laser defining a second transfer characteristic and being operated with a bias current, said second control signal adjusting the bias current in order to adjust the second transfer characteristic.

7. The apparatus of claim 1 wherein the module comprises:
   a detector arranged to generate a first error signal corresponding to the number of errors in a number of bits of the data; and
   a counter arranged to generate a second error signal corresponding to the number of bits of the data.

8. The apparatus of claim 7 wherein the controller comprises a processor arranged to divide the number of errors by the number of bits.

9. The apparatus of claim 1 wherein the communication path includes the transmitter and the receiver.

10. The apparatus of claim 1, comprising:
    a read-only memory device that receives the first control signal,
    wherein the memory device stores information relating to the transfer characteristic of the first component, and
    wherein the control signal determines which information is read out from the memory device and received by the first component.

11. The apparatus of claim 1, wherein the first control signal adapts the first component by selecting one of a first gain-frequency characteristic curve and a second gain-frequency characteristic curve for the first component.

12. In a system including a communication path that includes at least a first transfer characteristic of a transceiver for transmitting data on an optical fiber network and receiving data from the network, a method for adaptively adjusting the transceiver to reduce data transmission errors comprising:
    converting the data in the communication path to a form transmittable on the network comprising converting the data from parallel data at a first rate into serial data at a second rate faster than the first rate;

converting the data in the communication path received from the network to converted data having a form suitable for analysis;

analyzing the converted data to generate one or more error signals responsive to errors in the convened data;

generating at least a first control signal in response to the one or more error signals; and adjusting at least the first transfer characteristic of the communication path in response to the first control signal.

13. The method of claim 12 wherein the first transfer characteristic comprises a laser transfer characteristic controlled with a bias current and wherein the first control signal adjusts the bias current.

14. The method of claim 12 wherein the first transfer characteristic comprises an adjustable nonlinear transfer characteristic and wherein the first control signal adjusts the nonlinear transfer characteristic.

15. The method of claim 12 wherein the communication path includes a second transfer characteristic, said method further comprising:

analyzing the converted data to generate a second control signal in response to the one or more error signals; and adjusting the second transfer characteristic of the communication path in response to the second control signal.

16. The method of claim 12 wherein said generating one or more error signals comprises:

generating a first error signal corresponding to the number of errors in a number of bits of the data;

generating a second error signal corresponding to the number of bits of the data; and sending the first error signal and the second error signal using time division multiplexing.

17. The method of claim 16 wherein said generating the first control signal comprises dividing the number of errors by the number of bits.

18. An optical transceiver module that communicates with an optical fiber network, comprising:

a media access controller comprising a processor;

a single integrated circuit chip physical layer operatively coupled to the media access controller, the single integrated circuit chip physical layer comprising a digital core and a receiver, the receiver comprising an amplifier; and a conversion module operatively coupled to the single integrated circuit chip physical layer, the conversion module comprising a transmitter, the transmitter comprising a laser diode, wherein the single integrated circuit chip physical layer receives data from the media access controller via parallel data lines at a first rate and outputs the data to the conversion module via a single data line at a second rate faster than the first rate, wherein the digital core generates an error signal, wherein the processor receives the error signal and generates a control signal, and wherein the control signal adapts the laser diode and the amplifier.

19. The optical transceiver module according to claim 18, wherein the control signal adapts the amplifier by selecting one of a first gain-frequency characteristic curve and a second gain-frequency characteristic curve for the amplifier.

20. The optical transceiver module according to claim 18, comprising:

a read-only memory device that receives the control signal, wherein the memory device stores information relating to transfer characteristics of the amplifier, and wherein the control signal determines which information is read out from the memory device and received by the amplifier.

* * * * *

UNITED STATES PATENT AND TRADEMARK OFFICE
CERTIFICATE OF CORRECTION

PATENT NO. : 7,151,894 B2  Page 1 of 1
APPLICATION NO. : 10/409293
DATED : December 19, 2006
INVENTOR(S) : Nong Fan et al.

It is certified that error appears in the above-identified patent and that said Letters Patent is hereby corrected as shown below:

Column 7, line 5 delete "convened" and insert --converted--.

Signed and Sealed this

Sixth Day of November, 2007

JON W. DUDAS
*Director of the United States Patent and Trademark Office*